United States Patent [19]
Sutton et al.

[11] Patent Number: 5,705,791
[45] Date of Patent: Jan. 6, 1998

[54] AUTOMATIC TOASTER AND A CONTROL THEREFOR

[75] Inventors: Timothy B. Sutton, Bellevue, Wash.; Donald E. Schnautz, Stevensville, Mich.; Patrick L. Glotzbach; Arlene Richardson, both of St. Joseph, Mich.

[73] Assignee: Whirlpool Corporation, Benton Harbor, Mich.

[21] Appl. No.: 768,390

[22] Filed: Dec. 20, 1996

[51] Int. Cl.$^6$ ............... A47J 37/08; H05B 1/02
[52] U.S. Cl. ............ 219/492; 99/327; 99/329 P; 219/497; 219/518
[58] Field of Search ............ 99/325–333, 385, 99/389, 391; 219/492, 494, 497, 514, 518, 501, 502, 505, 506, 521, 490, 491

[56] References Cited

U.S. PATENT DOCUMENTS

| | | | |
|---|---|---|---|
| 2,147,376 | 2/1939 | Lucia | 99/333 |
| 2,431,195 | 11/1947 | Olving | 219/492 |
| 2,567,075 | 9/1951 | Lindberg | 99/328 |
| 2,584,725 | 2/1952 | McNairy | 219/492 |
| 2,842,200 | 7/1958 | Graham | 219/492 |
| 3,956,978 | 5/1976 | Borley | 99/329 R |
| 4,245,148 | 1/1981 | Gisske et al. | 219/492 |
| 4,296,312 | 10/1981 | Salem | 219/501 |
| 4,454,803 | 6/1984 | Wolf et al. | 99/329 |
| 4,487,115 | 12/1984 | Su | 99/327 |
| 4,503,758 | 3/1985 | Carville | 99/329 |
| 4,510,376 | 4/1985 | Schneider | 219/492 |
| 4,518,849 | 5/1985 | Rolland | 219/492 |
| 4,755,656 | 7/1988 | Charlesworth et al. | 219/492 |
| 4,894,518 | 1/1990 | Ishikawa et al. | 219/413 |
| 5,044,263 | 9/1991 | Birkert et al. | 99/327 |
| 5,128,521 | 7/1992 | Lanno et al. | 219/497 |
| 5,193,439 | 3/1993 | Finesman et al. | 99/327 |
| 5,283,421 | 2/1994 | Richards | 219/492 |
| 5,319,171 | 6/1994 | Tazawa | 219/705 |
| 5,414,243 | 5/1995 | Snell et al. | 219/492 |
| 5,438,914 | 8/1995 | Hohn et al. | 99/327 |

*Primary Examiner*—Timothy F. Simone
*Attorney, Agent, or Firm*—Robert O. Rice; Mark A. Davis

[57] ABSTRACT

An automatic countertop toaster and its control that divides the toasting cycle into three thermodynamic phases related to a change in the physical characteristics of the toaster and the item being toasted. The time of each of the three phases is adjusted according to the user inputs and current conditions to obtain the proper toasting time. The invention disclosed uses a microcomputer to interface with the user and control the toaster. The measured or estimated time since the last toasting cycle and the temperature inside the toaster are used by the microcomputer in table lookups to set the times for the three thermodynamic phases of the toasting cycle. Two of the phases are further modified by the toasting mode (normal, frozen, bagel, frozen bagel, reheat) and the toast darkness setting selected by the user. The sum of the three phases after modification is the total toasting time.

21 Claims, 3 Drawing Sheets

AUTOMATIC TOASTER AND A CONTROL THEREFOR

BACKGROUND OF THE INVENTION

1. Field of the Invention

This invention is an automatic toaster, and, more specifically a countertop toaster with a control that improves the consistency of the toasted item's color for a degree of darkness selected by the user for initial and subsequent batches.

2. Description of the Related Art

Contemporary countertop toasters usually provide a means of controlling the toast cycle time to adjust for user preferences and some also attempt to compensate for the residual heat left in the cavity from previous toast batches. While most toasters attempt to permit for user selection through the use of a rheostat, potentiometer or similar device, and many include a means to compensate for preheating of the unit, virtually all are unable to accurately adjust the toast cycle time due to previous cycles to produce consistent toast color in subsequent batches. This is due in part to the inability of current toasters and their controls to accurately approximate and compensate for the very complex and changing thermodynamic conditions of the toasting cycle and the inherent inaccuracies in low cost components used in most mass produced toasters.

As an example in Larmon et al. U.S. Pat. No. 5,128,521, issued Jul. 7, 1992, a microcomputer is used in a "pop-up" toaster that provides toast, bakery or pastry modes to toast a product to some preselected color. The cycle time is a single step decoding of a set of toast cycle time tables. Decoding inputs to the tables are selected toast color, elapsed time since the last toast cycle, and the number of cycles run by the toaster for a given time period prior to the start of the present cycle. The decoded toast cycle time is then modified by factors due to selected mode and previously selected modes, a relationship of selected toast color to toast color selected last cycle, the time since the last cycle, and the selected toast color. However, such a control does not accurately compensate for the complex and changing thermodynamic conditions as the toast is toasted.

An embodiment of the invention will now be described in reference to a countertop toaster and by way of example only with the understanding that other types of food products, not just bread slices could be toasted in accord with the present invention.

SUMMARY OF THE INVENTION

The toaster and its control process and control according to the invention overcomes the aforementioned problem by dividing the toasting cycle into three distinct thermodynamic phases. Each phase is then approximated by a thermodynamic system equation in one or two unknowns and system constants. The toasting cycle's base time is the sum of the times for the three phases. The toaster is operable in a normal, frozen, bagel, frozen bagel, and reheat mode. The toasting cycle duration for the normal mode is the base time. The toasting cycle duration for other modes is a modification of this base time by a fixed multiplying factor or a variable adder that depends on the time determined for the second phase.

DESCRIPTION OF THE PREFERRED EMBODIMENT

Figure 1:
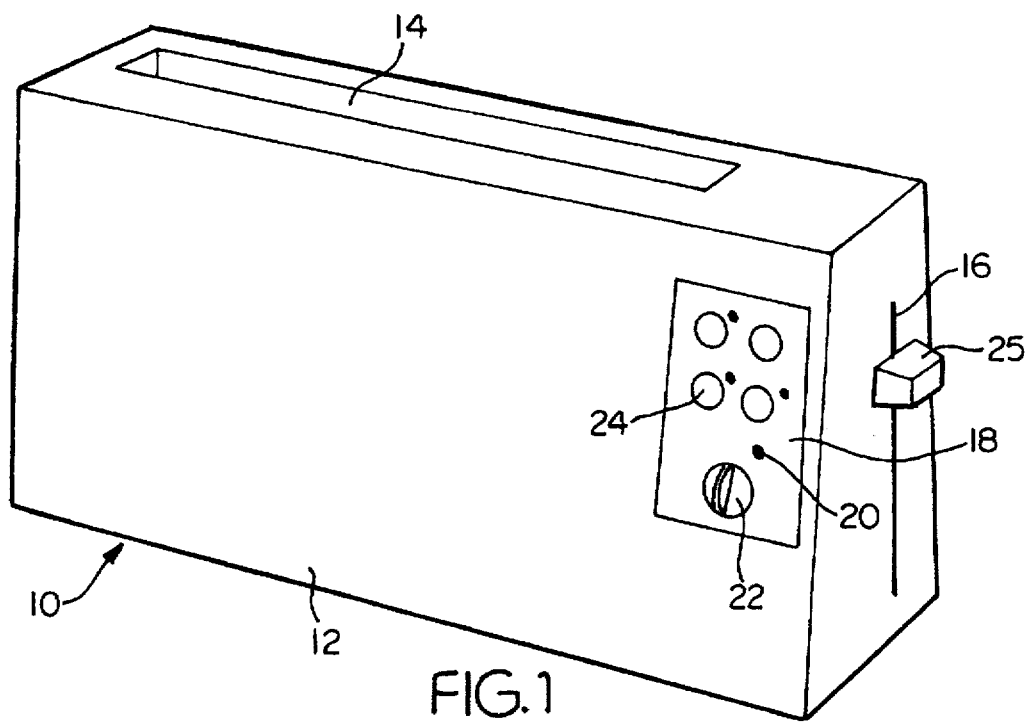
FIG. 1 is a perspective view of a toaster embodying the present invention.

The toaster control process and control described in this invention overcomes the inability of prior art toaster to provide repeatedly consistent toast color by breaking the toasting cycle into three distinct phases. The first is the element heat up phase. The second is the heat transfer phase. The third is the browning phase. These three phases can be more easily understood and predicted individually for the control process than by looking at the entire toasting cycle as a whole.

The first phase of the toasting cycle is the time from the moment the heating elements are energized until they are hot enough to radiate sufficient heat to begin toasting. At the first phase the toast is relatively cool and typically has a relatively high moisture content. This phase can be very accurately predicted using only the time since the last cycle (t) as an input. Therefore, the only variable needed to determine the time for phase one is the time since the last cycle. A temperature input is not needed to accurately predict this time for the first phase. The duration of this phase ($\Phi_1$) is a function of the thermal properties of the heating elements. In practice using standard elements, $\Phi_1$ typically varies from 5 seconds, for short intervals of time between successive cycles, to 30 seconds for long intervals. The following equation governs the relationship between phase one duration $\Phi_1$ and t.

$$\Phi_1 = A + B(1-e^{-t/C})$$

Where:

$\Phi_1$ = Phase one duration in seconds.

A = System constant that is the time in seconds required for the phase if the time between cycles is short.

B = System constant that is the additional time in seconds required for the phase if the time between cycles is long.

C = System exponential time constant in seconds that is a function of the thermal characteristic of the heating elements.

t = Time in seconds since the last cycle was completed.

The second phase of the toasting cycle is the time from the moment the heat transfer to the bread begins until the moment browning begins. At the beginning of the second phase the toast is warmed, but still has a relatively high moisture content, which is evaporated during the second phase. The duration of phase two ($\Phi_2$) is a function of both time since last cycle (t) and the initial cavity temperature ($T_0$). The following equation governs the relationship between phase two duration $\Phi_2$, t and T0.

$$\Phi_2 = [1/T_0] \cdot [(D-E) \cdot e^{-t/F} + E] \cdot [G + H(1-e^{-t/t})]$$

Where:

$\Phi_2$ = Phase two duration in seconds.

D = Asymptote maximum temperature of the cavity in degrees Fahrenheit.

E = Approximate room temperature in degrees Fahrenheit.

F = Cooling time constant in seconds that is a function of the thermal property of the toaster.

G=System constant that is the minimum heating time in seconds when the time between cycles is short.

H=System constant that is the additional heating time in seconds needed when the time between cycles is long.

C=System exponential heating time constant in seconds that is a function of the thermal property of the toaster.

t=Time in seconds since the last cycle was completed.

The equation for $\Phi_2$ adjusts the heating time to compensate for the residual heat in the cavity from previous toast cycles. The first half of the equation is the ratio of the initial temperature the cavity would be if the toaster started from a very hot state to the actual starting temperature. The product of that ratio and an exponential decay part of that equation is the duration for phase two.

The third phase of the toast cycle is the time from the moment browning begins until the desired level of darkness is achieved. At this phase, most of the moisture in the toast is evaporated, permitting all the heat radiated by the toaster to brown the toast instead of evaporating moisture. This, the third phase is relatively short in duration. Equation three governs the duration of this phase.

$$\Phi_3 = [Dark/R_{max}] \cdot [J + K(1 - e^{-t/L})]$$

Where:

$\Phi_3$=Phase three duration in seconds.

J=System constant that is the time in seconds required for the phase if the time between cycles is short K=System constant that is the additional time in seconds required for the phase if the time between cycles is long.

L=System exponential time constant in seconds that is a function of the thermal characteristic of the heating elements.

t=Time in seconds since the last cycle was completed.

Dark=Resistance of darkness control 22 set by the user.

$R_{max}$=Maximum resistance of darkness control 22.

The total toast cycle time is the sum of the three phases.

$$T_{total} = \Phi_1 + \Phi_2 + \Phi_3$$

In the preferred embodiment the equations described above are reduced to integer math through the use of lookup tables. The time since the last cycle is tracked, the temperature of the cavity of the toaster is monitored. These two measurements are used as inputs into the lookup table, lookups 46 which contain values necessary to generate times for the three phases of the toast cycle. This method of implementation sacrifices some precision due to bypassing the exact equations in favor of tables (tables are more readily implemented in the 8-bit architecture of affordable microcomputers); however performance tests have shown this loss to be negligible. The validity of the equations mentioned above will hold for any toaster. The necessary constants (A, B, C, etc.) vary depending on the components and construction of the toaster and can be derived through simple test procedures.

The time to begin browning of this method is affected by many uncontrollable variables. Examples are bread type, bread temperature and moisture level, ambient conditions, etc. The control can be optimized for a particular bread type, such as white bread, and the user can then compensate for the different types of bread used through a suitable user interface. To achieve the desired consistency, the toaster control delivers the same amount of energy to similar food items in each cycle, final darkness level will vary if the bread type varies between cycles. If a food item input does change, the user can compensate by adjusting the darkness accordingly.

Referring now to FIG. 1, a countertop toaster embodying the preferred form of the present invention is generally indicated by reference character 10. The toaster 10 comprises an exterior housing 12 that contains a bread slot 14, a lever slot 16, and a display/input area 18. The bread slot 14 is adapted to receive a wide variation of bread sizes. A bread carriage (not shown) is provided in the bread slot 14 and holds the bread when it is placed within the bread slot 14. Also shown is lever 25 that is mechanically attached to the bread carriage (not shown) and is spring biased upward. The bread carriage is coupled to the lever 25 so that the relative movement of the lever 25 results in a corresponding movement of the bread carriage.

The display/input area 18 contains indicators 20, darkness control 22, and switches 24 for permitting user input of toasting modes and performances, and providing the user with a visual indication of the selections and the status of the toaster. Indicators 20, used for status information, indicate modes and inputs. In the preferred embodiment, indications are provided for modes and inputs generally related to a cooking cycle or the type of toast article, such as Frozen, Bagel, Frozen Bagel, Reheat, and Toasting. Similarly, switches 24, used for inputting commands, are Frozen, Bagel, Reheat, and Cancel. Many other modes are possible and can easily be incorporated into the control. The darkness control 22, which can be any suitable electrical, electromechanical, or mechanical control, but is preferably a rotary type such as a rheostat. Darkness control 22 could be graduated so that the user rotating the darkness control 22 clockwise can select from a lighter to a darker setting.

The display input area 18 along with lever 25 could be used to select various toaster 10 operating modes like Normal, Frozen, Bagel, Frozen Bagel, and Reheat. These various modes could be selected by the user to toast various foods under various conditions in the toaster 10.

As an example, Normal mode could be selected by default when lever 25 is lowered without pressing any switches 24 or when lever 25 is lowered and switches have been pressed to turn off all indicators. The Toasting indicator remains on until the cycle is complete when the lever 25 is raised and the Toasting indicator is turned off. The other modes would be selected by pressing the appropriate switches 24 either before or after the lever 25 is lowered. The selected mode would be shown by the indicators 20.

Figure 2:
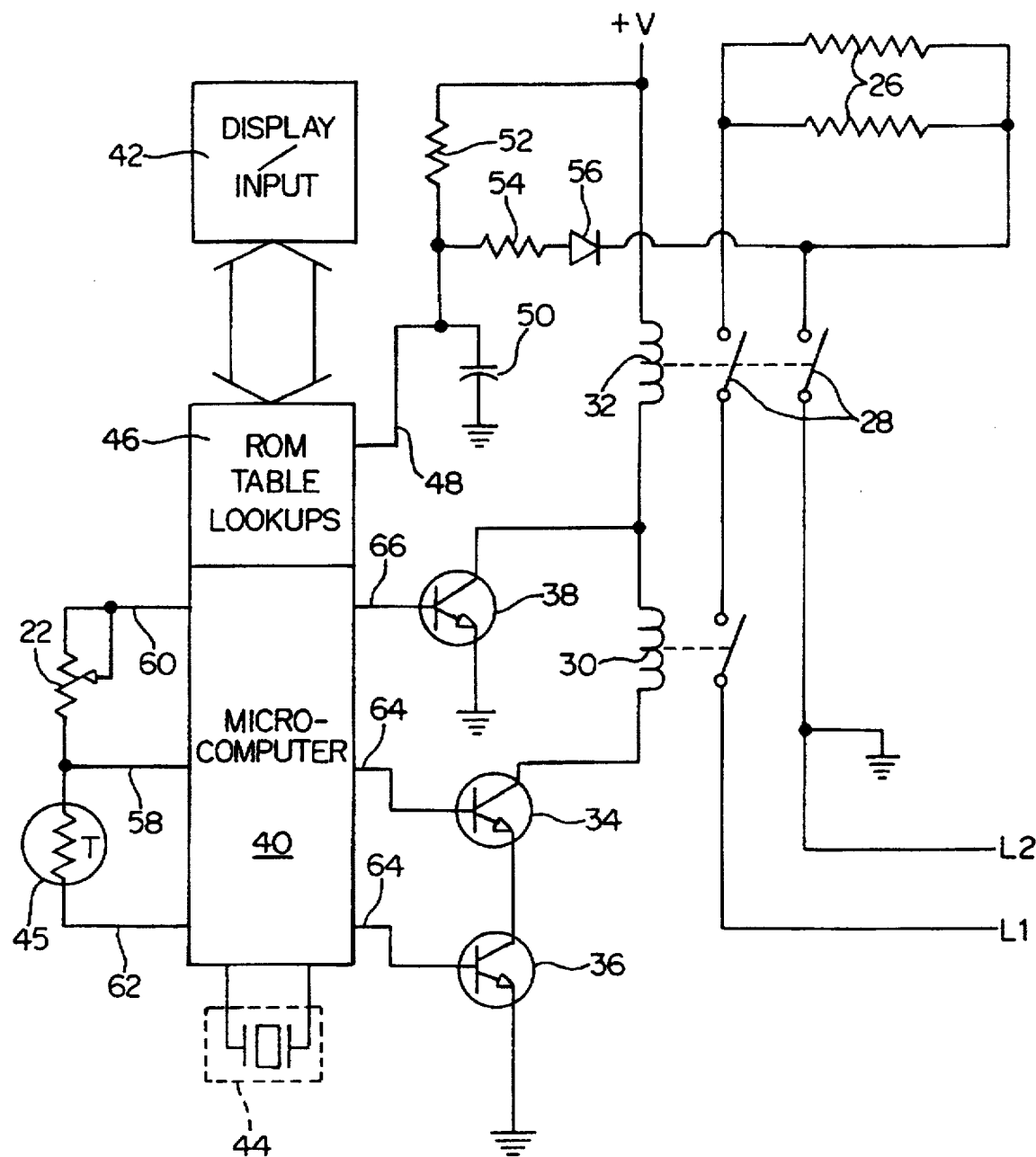
FIG. 2 is a schematic and block diagram of a microcomputer control system for the toaster of FIG. 1.

FIG. 2 illustrates the control and control circuit for the toaster 10. The control centers on a microcomputer 40, which is a device such as the Motorola MC68HC705P9 or a Microchip (PIC 16C5716C57), that receives user inputs from the display input area 18 and lever 25 for use in controlling the operation of the toaster 10. Microcomputer 40 also measures time counting oscillations of crystal 44 and measures the temperature inside toaster 10 using thermistor 45. Microcomputer 40 then uses this information with the table lookups 46 to determine the total cycle time, and to control heaters 26 through transistors 34, 36, and 38.

In the circuitry shown in FIG. 2, the parallel connected heaters 26 are connected through the double pole contacts of power switch 28 and the single pole contact of power relay 30 to L1 and L2 (L2 is also internal circuit common or ground). L2 is called neutral when it is connected to the centertap of the power company's service transformer.

Holding coil 32 and power relay 30 are in series from +V to ground through transistors 34 and 36 connected in series. Holding coil 32 is also connected from +V to ground through transistor 38. Microcomputer 40 controls transistors 34, 36, and 38 through their base drives to ground.

The input lever position 48, of microcomputer 40, is connected to ground through capacitor 50, to +V through resistor 52, and to one side of heaters 26 through resistor 54 and diode 56 in series. The signal at lever position 48 is used to detect the up or down position of lever 25.

Output sense 58 of microcomputer 40 is connected through darkness control 22 to the input darkness 60, and to input temp 62 through thermistor 45. The signals at darkness 60 and temp 62 are used to determine the degree of darkness set and the temperature inside toaster 10.

In operation, the control circuitry of FIG. 2 is kept energized by a conventional type power supply as long as the toaster 10 is connected through L1 and L2 to electrical power. The user moving lever 25 down mechanically closes the contacts of power switch 28 to ground the anode of diode 56 and discharge capacitor 50 through resistor 54. Microcomputer 40 senses a voltage change at input lever position 48 from the +V, the level capacitor 50 was charged via resistor 52, to a lower level set by resistors 52 and 54. Microcomputer 40 then turns on transistors 34 and 36 through outputs relay 64 that energizes the coil of power relay 30 and the holding coil 32. The contact of power relay 30 closing completes the circuit to energize heaters 26 and start the toasting process. Energized, holding coil 32 magnetically holds lever 25 down which maintains the contacts of power switch 28 in the closed position. Two transistors 34 and 36 driven from separate outputs relay 64 are used in the power relay 30 circuit to improve the reliability of turning the circuit off. Failure of either transistor 34 or 36 to a shored condition, or failure of either microcomputer 40 output relay 64 to the on condition will still give a result where microcomputer 40 can turn power relay 30 off, removing power to heaters 26.

Microcomputer 40 determines the setting of darkness control 22 and the temperature sensed by thermistor 45 by reading a voltage at inputs darkness 60 and temp 62 respectively after turning on output sense 58.

When microcomputer 40 determines that the toasting cycle is complete, it turns off outputs relay 64 that turns off transistors 34 and 36, which turns off and opens the contacts of power relay 30 and turns off holding coil 32 that allows the spring loaded lever 25 and the bread carriage to move upward. Should lever 25 fail to rise at the end of the cycle due to mechanical jam or spring failure, the contacts of power relay 30 are open and power is removed from heating elements 26. In this failed condition, prior art toasters have not had a means to turn off the heating elements and fire was often the result.

The circuitry of FIG. 2 has additional utility should microcomputer 40 sense a very high temperature inside toaster 10. Microcomputer 40 can turn on transistor 38 through its base drive to ground by turning on the output coil 66 and turning off transistors 34 and 36 by turning off outputs relay 64. This will maintain power to holding coil 32 keeping lever 25 in the lowered position while removing power to power relay 30 allowing the contacts of power relay 30 to open and remove power to heating elements 26.

Figure 4:
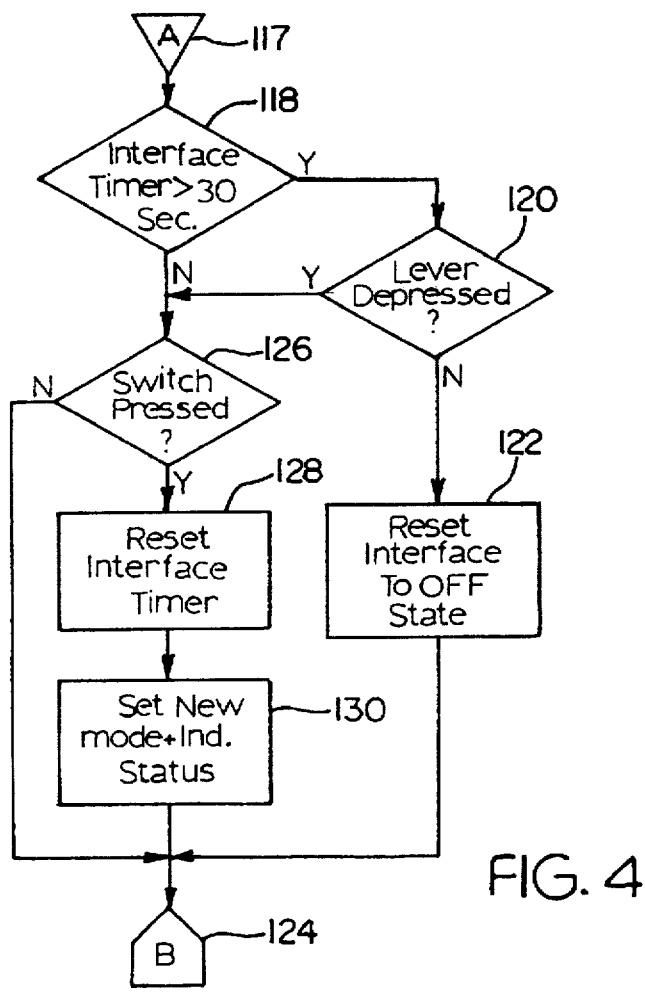
FIG. 4 is a subroutine of the flow diagram of FIG. 3.
Figure 3:
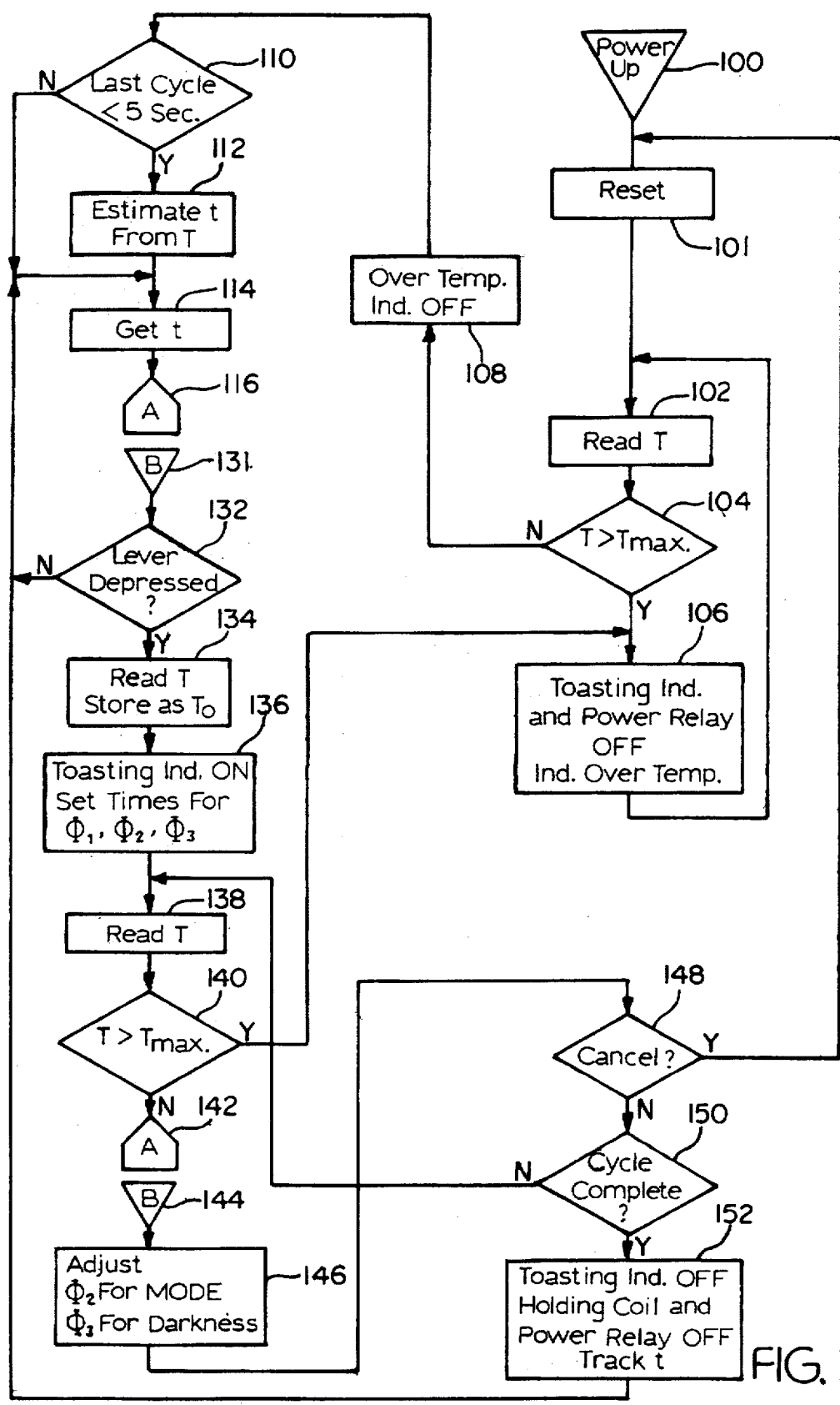
FIG. 3 is flow diagram of the toasting control process for the toaster of FIG. 1.

Referring to FIGS. 3 and 4, wherein the flowcharts illustrate the operation of microcomputer 40 in controlling toaster 10 through the circuitry of FIG. 2. At block 100 the microcomputer 40 powers up then at block 101 sets initial conditions and turns all outputs off. At block 102 the temperature T inside toaster 10 is read by thermistor 45. Then at block 104 the temperature T is compared to a maximum temperature and $T_{max}$ chosen for safety preferably is 350° F. If the temperature T is greater than $T_{max}$, then at block 106 indicator 20 Toasting is turned off, power relay 30 is turned off removing power to the heaters 26 and an over temperature indication is given by flashing the indicator 20 for Frozen periodically. After block 106 control is returned to block 102.

At block 104, if temperature T is less than or equal to $T_{max}$, control returns to block 108 and the over temp indication is turned off. Control then returns to block 110 and if the last toasting cycle ran for a period of less than 5 seconds control goes to block 112.

At block 112, t is estimated, t is the time period in seconds that has passed since the last cycle was completed. The estimate of t is done in a lookup table that uses the measured temperature T as an input. The values of the lookup table are empirically derived and vary depending on the components and construction of the toaster. In the preferred embodiment, for a temperature T greater than 200 degrees F., the time period t is set to 0 seconds, which is one of the table limits. For T less than or equal to 100 degrees F, the time period t is set to 840 seconds, which is the other table limit. The other values of the table fall within these limits.

Block 112 handles the conditions where power was lost, a switch 24 Cancel was pressed, or the lever 25 was pulled up before 5 seconds of the toasting cycle was complete.

From block 112 control goes to block 114, control also goes to 114 from block 110 if the last toasting cycle ran for a period of 5 seconds or more. At block 114, the measured or estimated value of t that will be used for establishing the times of the three phases of the toasting cycle, is selected for use. From block 114 control goes through connector 116 to connector 117 of FIG. 4 and on to block 118 of subroutine AB.

At block 118, if the interface timer has run more than 30 seconds since being reset, control passes to block 120. At block 120, if the lever 25 is not depressed, block 122 will reset the interface to the off state that resets the selection of any mode and turns all indicators 20 off. Control then leaves subroutine AB through connector 124 to connector 131 of FIG. 3.

If at block 118 the interface timer had run 30 seconds or less or at block 120 the lever 25 had been depressed, control goes to block 126. At block 126, if a switch 24 is not pressed, control leaves subroutine AB through connector 124 to connector 13 1 of FIG. 3. If a switch 24 is pressed at block 126 control goes to block 128 that resets the interface timer, and on to block 130 that sets a new mode and indicator 20 status. From block 130 control leaves subroutine AB through connector 124 to connector 131 of FIG. 3.

From connector 124 control goes to block 132. At block 132, if lever 25 is not depressed, control goes back to block 114 and on to recheck for user input. At block 132, if the lever 25 is depressed starting the toasting cycle, control goes to block 134 that reads temperature T and stores it as $T_0$. The value of $T_0$ will be used for establishing the times for the three phases of the toasting cycle.

Control then goes to block 136 where the power relay 30, holding coil 32, and the indicator 20 Toasting are energized. At block 136, with the KOM table lookups 46, the values that are used to set the time periods $\Phi_1$, $\Phi_2$, and $\Phi_3$ are chosen based on the time period t. For $\Phi_1$, the value of the table is used directly. For $\Phi_2$, the value of the table is divided by $T_0$ and then used. For $\Phi_3$, the value of the table used assumes the maximum darkness setting for now, which will be adjusted later.

Control proceeds to block 138 where temperature T is read. Then at block 140 the temperature T is compared to $T_{max}$ and if T is greater control continues to block 106 for setting the over temperature condition. If T is not greater, control passes through connector 142 to connector 117 of FIG. 4 and on to block 118 of subroutine AB. The flow of subroutine AB is identical to the above description when it was entered from connector 116. Control leaves subroutine AB through connector 24 to connector 144 of FIG. 3.

Control proceeds to block 146 where adjustments are made to the time periods of phase two and phase three set at block 136. Phase two is modified according to the mode and phase three is modified according to the toast darkness setting chosen by the user. The toast darkness setting chosen is Dark (Resistance of the darkness control 22). Dark is divided by $R_{max}$ (Maximum resistance of darkness control 22) and then applied. The following are the adjustments made for the different modes.

Normal Mode Total Time=$\Phi_1+\Phi_2+Dark/R_{max}*\Phi_3$

Frozen Mode Total Time=Normal Mode Total Time+ 0.375* $\Phi_2$

Bagel Mode Total Time=Normal Mode Total Time+ 0.75*$\Phi_2$

Frozen Bagel Total Time=Normal Mode Total Time+$\Phi_2$

Reheat Total Time=Normal Mode Total Time*0.375

After block 146 control goes to block 148 where if the switch 24 Cancel was pressed control goes back to the reset block 101. If switch 24 Cancel was not pressed, control goes to block 150 where if the toasting cycle is not complete control goes to block 138. If at block 150 the toasting cycle is complete, control goes to block 152 where the indicator 20 Toasting, the power relay 30, and the holding coil 32 all are turned off removing power to the heaters 26 and allowing lever with the attached bread carriage (not shown) to move to the up position. At block 152 microcomputer 40 starts tracking time t that will be used in the next toasting cycle. After block 152 control goes back to block 114.

As can be seen by the above description, the toaster and its control according to the invention breaks the toasting cycle into three thermodynamic phases related to a change in the physical characteristics of the toaster and the item being toasted. The time of each of the three phases is adjusted according to user inputs and current conditions to obtain the proper toasting time. The resulting benefit over previous toasters is the improved and repeatable consistency of the toasted item's color even if there is a change in the degree of darkness selected by the user for initial and subsequent batches.

Although the present invention has been described with reference to a specific embodiment, those of skill in the art will recognize that changes may be made thereto without departing from the scope and spirit of the invention as set forth in the appended claims.

We claim:

1. A method for determining a toasting time for an automatic toaster comprising a housing having an opening providing access to a toasting area, a heating element positioned within the toasting area for imparting heat to a toast article, and a toaster control for controlling the operation of the toaster, including the duration of the operation of the heating element, the toaster control including a microprocessor and a user input for selecting operational modes and toast darkness levels, the method comprising:

determining a first time period which represents the time it takes for the heating element to warm up and begin transferring heat to a toast article;

determining a second time period which represents the time from the beginning of the transferring of heat to the beginning of the browning of the toast article; and determining a third time period which represents the time from the beginning of the browning until reaching the desired darkness level of the toast article;

whereby the sum of the first, second, and third time periods is the toasting time.

2. The method of claim 1, further including the step of determining the time since the toaster was last operated (t).

3. The method of claim 2, wherein the step of determining time t includes sensing a temperature $T_0$ of the toasting area by a temperature sensor connected to the microprocessor and looking up a value of the time t in a table stored in memory of the microprocessor based on the temperature $T_0$.

4. The method of claim 2, wherein the step of determining the time t comprises counting the time since the last operation of the toaster with the microprocessor and storing the time t in the memory of the microprocessor.

5. The method of claim 4, wherein the step of determining the first time period includes looking up a value of the first time period in a table stored in memory of the microprocessor based on the time t.

6. The method of claim 5, wherein the look up value is an approximation.

7. The method of claim 1, wherein the step of determining the second time period includes compensating for any residual heat in the toasting area.

8. The method of claim 7, wherein the step of compensating for residual heat includes determining the initial temperature ($T_0$) in the toasting area.

9. The method of claim 8, wherein the step of determining $T_0$ includes sensing the temperature of the toasting area by a temperature sensor connected to the microprocessor.

10. The method of claim 9, further including determining if an overheating condition exists by the microprocessor comparing the sensed temperature with a maximum temperature stored in the memory of the microprocessor.

11. The method of claim 9, wherein the temperature sensor is a thermistor connected to the microprocessor.

12. The method of claim 8, further including the step of determining the time since the toaster was last operated (t).

13. The method of claim 12, wherein the step of determining the second time period includes looking up a value of the second time period in a table stored in memory of the microprocessor based on the time t and the temperature $T_0$.

14. The method of claim 13, wherein the step of determining the second time period includes modifying the table look-up value to compensate for an operational mode selected by the user via the user input.

15. The method of claim 14, wherein the operational mode corresponds to the type of toast article.

16. The method of claim 14, wherein the operational mode corresponds to a toasting cycle.

17. The method of claim 1, wherein the step of determining the third time period includes determining the darkness level selected by the user via the user input.

18. The method of claim 17, wherein the step of determining the user selected darkness level includes sensing the darkness level from a darkness control provided on the user input.

19. The method of claim 18, wherein the step of determining the third time period includes determining the initial temperature ($T_0$) in the toasting area and looking up a value of the third time period in a table stored in memory of the microprocessor based on the temperature $T_0$.

20. The method of claim 19, wherein the step of determining the third time period includes modifying the looked-up value of the third time period by the user selected darkness level.

21. The method of claim 1, and further comprising the step of turning off the power to the heating element at the completion of the toasting cycle.

* * * * *